US008765240B2

(12) United States Patent
Grigo et al.

(10) Patent No.: US 8,765,240 B2
(45) Date of Patent: Jul. 1, 2014

(54) MOLDING COMPOUND COMPRISING A POLYESTER RESIN COMPOSITION, FILM PRODUCED FROM THE MOLDING COMPOUND AND METHOD FOR PRODUCING A FILM OR FILM WEB

(75) Inventors: Thorsten Grigo, Teising (DE); Max Niegl, München (DE); Guenter Deiringer, Kastl (DE)

(73) Assignee: Kloeckner Pentaplast GmbH & Co. KG, Heiligenroth (DE)

( * ) Notice: Subject to any disclaimer, the term of this patent is extended or adjusted under 35 U.S.C. 154(b) by 1238 days.

(21) Appl. No.: 11/909,198

(22) PCT Filed: Mar. 28, 2006

(86) PCT No.: PCT/EP2006/002804
§ 371 (c)(1),
(2), (4) Date: Sep. 20, 2007

(87) PCT Pub. No.: WO2006/103044
PCT Pub. Date: Oct. 5, 2006

(65) Prior Publication Data
US 2009/0029134 A1    Jan. 29, 2009

(30) Foreign Application Priority Data
Mar. 31, 2005  (DE) .......................... 10 2005 014 636

(51) Int. Cl.
*B29C 51/00* (2006.01)
(52) U.S. Cl.
USPC ......... 428/35.7; 428/34.1; 525/128; 525/154; 525/67; 525/166

(58) Field of Classification Search
USPC .................. 524/513, 128, 139; 525/400, 437; 428/141
See application file for complete search history.

(56) References Cited

U.S. PATENT DOCUMENTS

| 4,442,262 A | 4/1984 | Yusa et al. | |
| 5,102,943 A * | 4/1992 | Logullo | 524/487 |
| 6,068,910 A * | 5/2000 | Flynn et al. | 428/141 |
| 2003/0109629 A1* | 6/2003 | Pierre et al. | 524/513 |
| 2004/0157069 A1 | 8/2004 | Klein et al. | |

FOREIGN PATENT DOCUMENTS

| DE | 100 58 133 A1 | 5/2002 |
| DE | 102 56 493 A1 | 7/2003 |
| EP | 0 655 320 A1 | 5/1995 |
| EP | 1 066 339 B1 | 9/1999 |
| WO | 03/035726 A1 | 5/2003 |

\* cited by examiner

*Primary Examiner* — Ellen S Raudenbush
(74) *Attorney, Agent, or Firm* — ProPat, L.L.C.

(57) ABSTRACT

The invention relates to a molding compound including a polyester resin composition, ABS components, waxes, matting agents and optionally vegetable oil, which is used to produce films with a low luster, improved thermal resistance of the film and/or of the surface structure and an increased shrinking onset temperature, in addition to a modified shrinkage progression in comparison to films without the aforementioned additives. The fraction of the polyester resin composition is between 30 and 97 wt. % and the fraction of the additives between 1.5 and 70 wt. %, in relation to the total weight of the molding compound. The films are used as shrink-wrapping and packaging films and films for furniture and printed circuit boards.

29 Claims, 1 Drawing Sheet

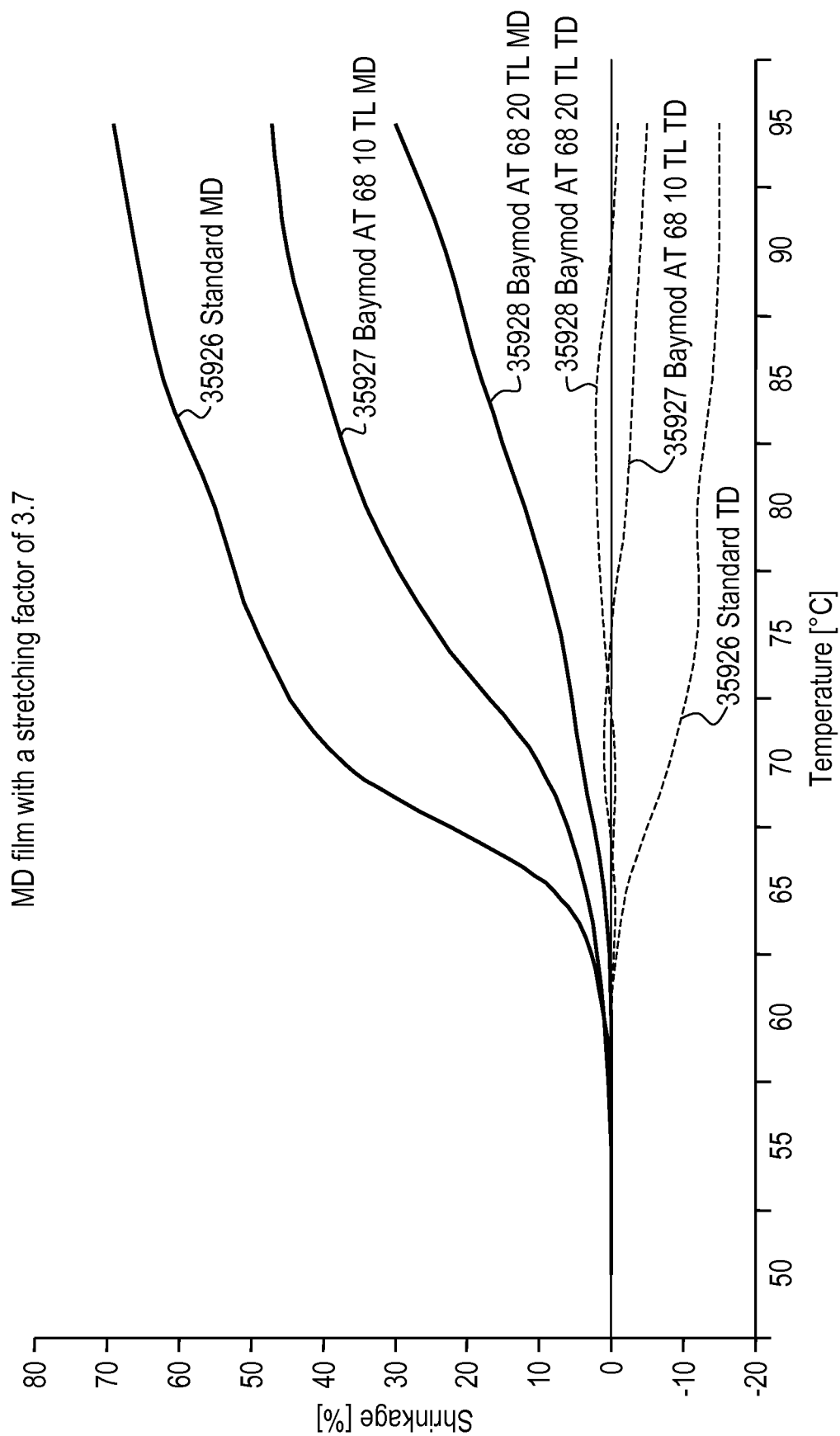

US 8,765,240 B2

MOLDING COMPOUND COMPRISING A POLYESTER RESIN COMPOSITION, FILM PRODUCED FROM THE MOLDING COMPOUND AND METHOD FOR PRODUCING A FILM OR FILM WEB

CROSS-REFERENCE TO RELATED APPLICATIONS

This application is being filed under Rule 1.371 as a National Stage Application of pending International Application No. PCT/EP2006/002804 filed Mar. 28, 2006, which claims priority to the following parent application: German Patent Application No. 10 2005 014 636.8, filed Mar. 31, 2005. Both International Application No. PCT/EP2006/002804 and German Patent Application No. 10 2005 014 636.8 are hereby incorporated by reference herein in their entirety.

FIELD OF THE INVENTION

The invention relates to a molding material composed of a polyester resin composition, which is composed of at least 80 mol % of a diacid radical component and from 80 to 100 mol % of a diol radical component, selected from diols having from 2 to 10 carbon atoms and from 0 to 20 mol % of a modified diol, and composed of additives from the group of matting agents, and relates to waxes, based on polymeric modifiers, such as ABS components, and also relates to a film, produced from the molding material, and to a process for production of a film or of a film web.

A film or film web is produced from the molding material via plastification and subsequent extrusion through a die or via calendering, and is further processed in-line or off-line, for example via orientation and/or embossing.

BACKGROUND OF THE INVENTION

It is known that plastified and rigid polyester resin compositions are modified via addition of various additives, in order to obtain desired property profiles in the film webs or films produced therefrom. Known polyester resin compositions can be thermoformed and are suitable for a wide variety of applications, for example as packaging films, shrink films, and rigid films. Materials added for modification of these polyesters comprise modifiers to improve tensile impact strength, and to improve heat resistance, processing aids to improve processability and to improve the output of the production plant, lubricants to improve gelling performance during manufacture, flow aids to improve thermoformability and orientability, matting agents to reduce gloss, and the like. The proportions by weight of the individual additives are, as a function of requirements, from 0.1 to greater than or equal to 40% by weight. Preferred additives used comprise copolymers of the main polymer, but these are generally very expensive, and have to be used at high concentrations, and also often fail to bring about the desired extent of improvements in property profiles.

EP 1 066 339 B1 describes a process for production of a film or of a sheet composed of a polyester resin composition via calendering. The polyester component of the resin is an amorphous or semicrystalline polyester, whose crystallization half time from a melt is at least 5 min. The polyester component is composed of at least 80 mol % of a diacid radical component, of from 80 to 100 mol % of a diol radical component, and from 0 to 20 mol % of a modified diol. The diacid radical component is based on 100 mol % of diacid radical, and the diol radical is based on 100 mol % of diol radical. The resin composition includes additives which can, for example, be an internal lubricant, antislip agent, or a mixture thereof, or matting agents. The amount of each additive added is from 0.01 to 10% by weight, based on the total weight of the resin composition.

Surprisingly, amorphous or semicrystalline polyester resin compositions of this type are suitable for calendering with the aid of conventional calendering processes for production of films or sheets. Such polyester resin compositions are marketed by Eastman Chemical Co., Tennessee, USA, with the trademark CADENCE ®. The polyester compositions are usually used as main polymer for production of polyester films, their amount used generally being more than 96% by weight, based on the total weight of the polyester films.

EP 0 655 320 B1 discloses a corrugated film composed of at least 50% by weight of PET and from 10 to 45% by weight of fillers, and also from 5 to 20% by weight of rubber, the film having a crystallinity gradient across its thickness. The fillers are mineral fillers, selected from the group consisting of quartz, calcium carbonate, talc, titanium dioxide, glass fibers, and mixtures thereof. The film is especially used for construction purposes.

DE 102 56 493 A1 relates to a thermally activatable coating composition, which is sealable with respect to all types of paper, with respect to plastics, and with respect to metals, and also with respect to itself. The coating composition is based on an ethylene-acrylate polymer or on an ethylene-methacrylate polymer, if appropriate modified with polyester or polyamide, where the proportion of the main polymer is from 40 to 96.5%. The composition can moreover comprise polyvinyl chloride and/or polyvinyl acetate, and/or polyurethane dispersions.

DE 100 58 188 A1 discloses molding materials composed of an elastomeric polymer A and of at least one thermoplastic polymer B. The thermoplastic polymer B has been selected from vinylaromatic polymers, polymers based on methyl methacrylate, polyesters, polymers based on imides, or a mixture of these. The rubber-containing thermoplastic molding material is an acrylonitrile-butadiene-styrene polymer (ABS), an acrylonitrile-styrene-acrylate polymer (ASA), a methyl methacrylate-acrylonitrile-butadiene-styrene polymer (MABS), or an acrylonitrile-(ethylene-propylene)-styrene polymer (AES). Moldings, films, fibers, and foams are produced from the molding material, the moldings being injection moldings.

Additives suitable for use in the inventive films are generally used in calendering of polymers, such as PVC or polyester.

EP 1 066 339 B1 discloses by way of example addition of antislip agent or lubricant as additive to the polyester resin composition, the selected proportion of these additives being from 0.01 to 10% by weight, based on the total weight of the polyester resin composition. The polyester resin compositions can moreover comprise an oxidative stabilizer and a melt-strength improver.

SUMMARY OF ADVANTAGEOUS EMBODIMENTS OF THE INVENTION

It is an object of the invention to provide a molding material for production of films and film webs based on a polyester resin composition, and thus to alter at least one of the following properties of the films: heat resistance, surface gloss, viscoelastic properties, such as the shape of the shrinkage curve of the oriented films in relation to onset of shrinkage, shrinkage profile as a function of shrinkage temperature, maximum shrinkage, and shrinkage force, and shrinkage curve gradient, roughness, and stability of emboss, in such a way as to give the films or film webs a property profile which opens up new application sectors for the films and film webs.

BRIEF DESCRIPTION OF THE FIGURES

FIG. 1 is a graphical illustration of shrinkage as a function of temperature for exemplary inventive and comparative films.

DETAILED DESCRIPTION OF ADVANTAGEOUS EMBODIMENTS OF THE INVENTION

The invention achieves this object by starting from a molding material of the type described in the introduction, the effect of the additives in the films produced from the molding material being to lower the gloss value, to increase roughness ($R_z$ value), to increase the heat resistance of the film, and/or to amplify its surface structure, and to modify the shrinkage profile of an oriented film, with respect to a reference film which has a polyester resin composition with at least 97% by weight of polyester, based on the total weight of the molding material. In the invention, the molding material is composed of from 30 to 97% by weight of polyester resin composition, up to 3.0% by weight waxes, and from 1.5 to 70% by weight of polymeric modifier additives, where the percentages by weight are based on the total weight of the molding materials.

In an embodiment of the invention, the proportions of the polyester resin composition are from 33.4 to 88.8% by weight, the proportions of the waxes are from 1 to 2% by weight, the proportions of the ABS components are from 5 to 64% by weight, and the proportions of a vegetable oil are from 0 to 0.6% by weight, based on the total weight of the molding material.

In an embodiment of the invention, the proportions of the polyester resin composition are from 90 to 97% by weight, the proportions of the matting agents are from 0.0 to 10% by weight, and the proportions of the waxes are from 1 to 3% by weight, based on the total weight of the molding material. The waxes advantageously comprise partially hydrolyzed ester wax and/or saturated, unbranched monocarboxylic acids, and/or montan waxes. The monocarboxylic acids are stearic acid or palmitic acid. The vegetable oil to be used is advantageously epoxidized soybean oil.

The ABS components are preferably acrylonitrile-butadiene-styrene, alpha-methylstyrene-acrylonitrile, and/or styrene-acrylonitrile (SAN), or a modified form of these. One or more matting agents is/are added to the polyester resin composition and have advantageously been selected from the group of calcium carbonate, aluminum silicate talc, magnesium silicate talc, acrylate-styrene copolymer, and high-molecular-weight and/or crosslinked PVC. In one preferred embodiment of the molding material, it comprises from 70 to 74% by weight of polyester resin composition, from 23 to 27% by weight of ABS components, 2% by weight of waxes, and 0.6% by weight of vegetable oil. In further embodiments, the proportion of the polyester resin composition in the molding material is smaller and is preferably from 49 to 52% by weight, while the proportion of the additives divides into from 46 to 48% by weight of ABS components, 2% by weight of waxes, and 0.6% by weight of vegetable oil. The proportion of the additives in the molding material can also be more than 50%, and by way of example the molding material thus comprises from 33 to 35% by weight of polyester resin composition, from 62 to 65% by weight of ABS components, 2% by weight of waxes, and 0.6% by weight of vegetable oil. Alongside the additives described above, matting agent may also have been added to the molding material. 4 to 6% by weight of matting agents and 2% by weight of waxes have in particular been added to the polyester resin composition here.

Films, film webs, profiles, sheets, and moldings are produced from the molding material.

For the purposes of the present object, the molding material is used to produce a film which has been extruded or calendered in unoriented form from the molding material with thickness of from 100 µm to 1 mm, and, if necessary, in an in-line or off-line step of the process, has been oriented longitudinally and/or transversely with respect to the film web, with a degree of stretching of from 1.1 to 7, in particular from 3 to 4. In an embodiment of the invention, the thickness of the oriented film is from 15 to 800 µm, in particular from 25 to 600 µm, and preferably from 35 to 500 µm.

The Vicat A50 softening point is greater than or equal to 78° C. to 115° C., while the Vicat B50 softening point is greater than or equal to 75° C. to 100° C.

Claims 20 to 24 give further properties of the inventive film.

The film is preferably used as furniture film and card film, and also as packaging film and shrink film.

In the invention, the process for production of a film or of a film web from a molding material encompasses the following steps:

(a) mixing of from 30 to 97% by weight of a polyester resin composition in the form of powder, of pellets, or of granules, and from 1.5 to 70% by weight of additives from the group of matting agents, waxes, ABS components, where the % by weight figures are based on the total weight of the molding material, and, if appropriate, addition of a vegetable oil;

(b) plastification and melting of the molding material prepared in step (a);

(c) extrusion or calendering of the molten molding material to give a film or film web at temperatures of from 150 to 250° C., and, if appropriate, (d) orientation of the film or film web in an in-line or off-line process with a degree of stretching of from 1.1 to 7.

The features of claims 26 and 27 give further embodiments of the process.

The films of the invention are used inter alia as furniture films, card films, packaging films, and shrink films.

Film examples are used below for further illustration of the invention.

Table 1 below gives comparative examples 1 and 2 and inventive examples 3 to 7, relating to blends composed of polyester resin compositions with ABS components, with waxes, and with a vegetable oil. Table 2 encompasses a comparative example 1 and inventive examples 2 to 5, which relate to blends composed of polyester resin compositions with matting agents and with waxes. In the formulation of the respective films, the chemical names for the individual films are stated, as also are their trademarks or grade names, and the respective supplier.

Comparative examples 1 and 2 in table 1 relate to PET films with a proportion of at least 97.4% by weight of polyester resin. Comparative examples 1 and 2 comprise no modifier and, as additives, only two waxes, which are lubricants. Very small amounts of a vegetable oil, namely epoxidized soybean oil, have also been added to comparative example 1. The polyester of comparative examples 1 and 2 is a polyester as disclosed, and protected by patent law, in EP 1 066 339 B1 of Eastman Chemical Co., Tennessee, USA. In inventive examples 3 to 7, the proportion of PET in the respective PET/ABS blends decreases from inventive example 3 in the direction of inventive example 5, while in inventive examples 6 and 7 it is greater than in inventive example 3. In inventive examples 3 to 5, from 2 to 3 different ABS components are used as modifiers. The wax additives of inventive examples 3 to 5 correspond to the wax additives of comparative example 1. In inventive examples 6 and 7, in each case only a single ABS component is added as additive to the blend. The proportions of waxes are slightly lower than in inventive examples 3 and 5. Inventive examples 6 and 7 comprise no vegetable oil.

The amount of, for example, from 12.5 to 26% by weight, based on the total weight of the molding material, of acrylonitrile-butadiene-styrene copolymers is preferably used as modifier in relation to tensile impact strength and heat resistance, and also in relation to transverse and longitudinal dimensional change. In inventive examples 3 to 5, a proportion of from 12.5 to 26% by weight, based on the total weight of the molding material, of alpha-methylstyrene-acrylonitrile is also added as modifier in relation to tensile impact strength and heat resistance. An amount of from 7 to 12% by weight, likewise based on the total weight of the molding material, of acrylonitrile-butadiene-styrene polymer is moreover used as third modifier in inventive examples 4 and 5.

The lubricants used preferably comprise waxes in which one of the waxes is a partially hydrolyzed ester wax and the other wax is composed of saturated unbranched aliphatic monocarboxylic acids, such as palmitic acid and stearic acid. For inventive examples 3 to 5, the proportion of the respective wax is 1% by weight, based on the total weight of the molding material. In inventive examples 6 and 7, the proportion of wax is 0.6% by weight for the individual wax. Mixtures of complex esters and of glycerol esters and/or of montan waxes can also be used as lubricant. The effective amount of lubricant is usually from 0.1 to 2.5% by weight, in particular from 0.6 to 1.0% by weight.

The polyester of the blends is, as mentioned above, a commercially available product from Eastman Chemical Co., Tennessee, USA, as described in European Patent EP 1 066 339 B1.

The molding material can also be colored with the aid of appropriate colorants or dyes, and white coloring is preferably achieved here with titanium dioxide and/or chalk. Commercially available flame-retardant additives and commercially available antistatic additives can also be added. Other materials that can be added comprise conventional plasticizers, other polymeric modifiers based on PMMA, on methylbutadiene-styrene (MBS), and on chlorinated polyethylene (PE), and other polymers known from PVC-modification, and also other processing aids. The molding material used as starting material for production of the film is prepared via mixing of from 30 to 97% by weight, based on the total weight of the molding material, of a polyester resin composition in the form of powder, of pellets, or of granules, with additives, the proportion of which is from 1.5 to 70% by weight. The molding material is plastified, and melted, and during calendering is rolled out to give a film or film web via passage through calender rolls of a roll calender at calender-roll temperatures of from 150 to 250 ° C. The calendered film is drawn off from the final calender roll of the roll calender (plastic orientation) and cooled by means of cooling rolls. The film can then be longitudinally and/or transversely oriented in an in-line or off-line process with a degree of stretching of from 1.1 to 7 and then wound up. The result of this is that the film is thinner and that its potential for shrinkage is lower, by virtue of the modifiers, when comparison is made with unmodified films, i.e. films which comprise no modifiers that affect tensile impact strength and shrinkage.

The thickness of the film is generally from 100 μm to 1 mm, and it is stretched, if necessary, with a degree of stretching of from 1.1 to 7, to thickness values of from 15 to 800 μm. The degree of stretching is the quotient calculated from the thickness of the film prior to orientation and the thickness of the film after the stretching procedure, and is preferably from 3 to 4, in particular 3.7. It is preferable to obtain films whose thickness is from 35 to 500 μm. By virtue of the modifiers based on ABS or SAN, there is also an advantageous effect on the shrinkage profile and the shrinkage force of the oriented films, the manner of which is namely that shrinkage begins at higher temperatures, shrinkage is reduced, and shrinkage profile is flattened.

Table 2 correlates a comparative example 1 and inventive examples 2 to 5. Comparative example 1 relates to a PET molding material without matting agent, comprising 98% by weight of polyester resin composition and 2% by weight of waxes, while the molding materials of inventive examples 2 to 5 have a proportion of from 1 to 5% by weight of matting agent, from 93 to 97% by weight of polyester resin composition, and 2% by weight of waxes. The polyester is a polyester as described, and protected by patent law, in EP 1 066 339 B1 of Eastman chemical Co., Tennessee, USA. Two different waxes A and B are used, the proportion of each of which is 1% by weight. The wax A is a partially hydrolyzed ester wax, and the wax B is composed of saturated, unbranched, aliphatic mono-carboxylic acids, mainly palmitic acid and steraric acid. Matting agents used comprise calcium carbonate, aluminum silicate talc, and acrylate-styrene copolymers. The matting agents improve the heat resistance of the surface emboss of films produced from the molding materials. This heat resistance of the surface emboss is what is known as the emboss-stability temperature. The molding material preferably comprises from 90 to 97% by weight of polyester resin composition, from 0 to 10% by weight of the matting agent, and from 1 to 3% by weight of waxes.

To determine stability of emboss, the gloss of a film is measured at a certain temperature, and the temperature is increased until an alteration in gloss occurs. The temperature at which the alteration in gloss occurs is termed the emboss-stability temperature. The use of matting agents moreover increase roughness. The $R_z$ value=0.45 of a comparative film of thickness 250 μm after heat treatment increases to a $R_z$ value=3.13 after heat treatment in the case of the inventive example.

The gloss of a film of thickness 250 μm is in the range from 8 to 32 for an angle of incidence of 20°. The gloss of a film of thickness 250 μm is from 65 to 90 for an angle of incidence of 85°. The emboss-stability temperature has increased to a range from 145 to 155° C., in particular 150° C., in the case of the inventive films whose thickness is 250 μm, in comparison with comparative example 1: 110° C.

The following properties were measured on the films.
1. The thickness was determined by a method based on DIN 53370 by means of a 543/250 B gauge from Mitutoyo, Japan. For the point measurements, the film was placed between the opened measurement surfaces of the gauge, these were then gently closed. The thickness was read off from the gauge.
2. Gloss-Method Based on DIN 67530
    Measurement using a reflectometer involves a parallel light beam impacting the test surface obliquely. The reflected radiation is measured. The standard uses a different angle of incidence for the incident beam as a function of the gloss level. To this end, an angle of incidence of 60° is first used. If gloss at an angle of incidence of 60° is more than 70, gloss is measured at an angle of incidence of 20°. If gloss at an angle of incidence of 60° is smaller than 30, gloss is then measured at an angle of incidence of 85°.

3. Emboss-Stability Temperature

Emboss-stability temperature is determined by an in-house method. To this end, films are clamped into a clamping frame and stored in an air cabinet at various temperatures. After removal of the films from the clamping frame, gloss is measured and compared with the initial gloss at a prescribed temperature. As soon as an alteration in gloss is detected, the temperature at which the alteration in gloss has occurred gives the emboss-stability temperature.

4. Roughness

Roughness ($R_z$ value) is determined to DIN EN ISO 4287. To this end, a diamond stylus is used to scan the surface of the film and a roughness profile is generated. From this, mathematical methods are used to determine the roughness parameters.

5. Vicat A50 Test-Method Based on DIN EN ISO 306

A long penetrator needle with circular cross section of area 1 mm² is placed perpendicularly, under a load of 10 N, on a horizontally placed specimen, which is a laminate of a plurality of films and whose thickness is from 3 to 5 mm. At a heating rate of 50° C. per hour, the temperature at which this needle has penetrated to a depth of 1 mm into the specimen is defined as the Vicat A50 softening point, and is measured.

6. Vicat B50 Test-Method Based on DIN EN ISO 306

A penetrator needle of length 3 mm with circular cross section of area 1 mm² is placed perpendicularly, under a load of 50 N, on the horizontally placed specimen, which is a laminate of a plurality of films and whose thickness is from 3 to 5 mm. At a heating rate of 50° C. per hour, the temperature at which this needle has penetrated to a depth of 1 mm into the specimen is defined as the Vicat B50 softening point, and is measured.

7. Tensile Impact Strength

This is measured longitudinally and transversely to DIN EN ISO 8256, by means of a pendulum impact tester. A single pendulum impact is used here to provide sufficient tension to fracture the film. The energy consumed here is determined from the energy loss of the pendulum, corrected for friction in the stay-set indicator and for other energy losses.

8. Longitudinal/Transverse Modulus of Elasticity

Longitudinal and transverse modulus of elasticity is determined to DIN EN ISO 527. To this end, a film strip of width 15 mm and length 170 mm is clamped between two clamps, the clamped length being 100 mm, and is subjected to tensile strain with a prescribed constant advance rate of 10 mm/min, with prescribed test conditions, for example standard temperature and humidity. Modulus of elasticity is determined as curve gradient from the tensile force/length change graph recorded.

9. Transverse Dimensional Change

This measurement is carried out to DIN 53377. To this end, the film is placed for 30 s in a water bath at a prescribed temperature of 75° C. and 95° C. The dimensional change that has occurred after this time is measured at room temperature.

10. Onset of Shrinkage

The temperature stated—rounded to 5° C. steps—is that at which the dimensional change of the film transversely is smaller than −1% and its dimensional change transversely is greater than −5%.

11. Shrinkage Tension

Shrinkage tension is measured by a method based on DIN 53369. A film strip of dimensions 100 mm×10 mm is clamped at 100° C. into the tester, which comprises a load cell, and the shrinkage force occurring during reversionary shrinkage is recorded. A calculation then converts the shrinkage force to maximum shrinkage tension.

Table 1 collates the additives, dimension units, and the thickness of the film, for comparative examples 1 and 2, and also for inventive examples 3 to 7. It is seen here that, given a maximum degree of stretching of 5 and a stretching temperature of 85° C. for the film, the transverse dimensional change of −65% at 75° C. for comparative example 2 decreases to −35% and −20% for inventive examples 6 and 7, respectively. In particular, the transverse dimensional change, measured at room temperature, is from −3 to −50% after storage of the film for 30 s in water at 75° C.

The transverse dimensional change of −76% at 95° C. in comparative example 2 decreases to −60% and −40%, respectively, in inventive examples 6 and 7. Very generally, the transverse dimensional change measured at room temperature is from −15 to −65% after storage of the film for 30 s in water at 95° C.

The addition of an impact-modifying component increases tensile impact strength. This is required with increased heat resistance, since tensile impact strength decreases as heat resistance increases.

Longitudinal and transverse modulus of elasticity changes only slightly. Longitudinal and transverse tensile impact strength increases markedly, as can be seen from a comparison of the values 267/300 from comparative example 1 with the values 444 to 538 kJ/m²/398 to 617 kJ/m² for inventive examples 3 to 5. Very generally, longitudinal tensile impact strength is in the range from 450 to 550 kJ/m². Transverse tensile impact strength is from 350 to 630 kJ/m². In terms of tensile impact strength, it is seen that inventive example 3 when compared with inventive examples 4 and 5, relates to a film which has a higher proportion of PET and a lower proportion of ABS components, and therefore has greater tensile impact strength than the films of inventive examples 4 and 5. This effect is caused by the ABS components, which increase heat resistance but make the material rather brittle.

The Vicat A50 softening point of comparative example 1 is 76° C., and this rises to a value greater than 110° C. in inventive example 5. Generally, the Vicat A50 softening point is greater than or equal to 78° C. to 115° C. Vicat B50 softening point behaves similarly, being 75° C. for comparative example 1 and rising to 94° C. in inventive example 5. Vicat B50 softening point is generally from 75° C. to 100° C.

The onset of shrinkage shifts from 60° C. in comparative example 1 to from 65° C. to 70° C., depending on the concentration of the ABS components.

As can be seen from table 2, the inventive films whose thickness is 250 μm have markedly lower gloss at all gloss angles when compared with comparative example 1. Table 2 states the gloss values for the front and reverse side of each film. For gloss angle 20°, gloss in comparative example 1 of 72.6/58.6 falls to 46.1/11.4 in inventive example 4 and to 14.3/8.9 in inventive example 5, as a function of the respective proportion of the matting components, which is lower in inventive example 4 than in inventive example 5. Gloss at gloss angle 60° in comparative example 1 is from 94 to 100, and falls in the inventive examples to values from 47 to 96. For gloss angle 85°, gloss of comparative example 1, from 94 to 100, falls to values from 61 to 95. The high gloss shows a larger fall for gloss angle 20° than for gloss angle 85°.

The emboss-stability temperature for the films of inventive examples 2 to 5 could be increased markedly in comparison with the film of comparative example 1, from 110° C. to 150° C. Roughness ($R_z$ value) of the inventive films rose from 0.4 µm to 3.4 µm. Roughness of the film of comparative example 1 was, for example, 0.41/0.45 µm (front/reverse side), and roughness of the film of inventive example 4 was 1.05/3.13 µm. These $R_z$ values are within the above range for roughness.

The inventive films are provided with a defined surface, via hot embossing, since the use for which they are intended is that of decorative furniture surfaces. Furniture films are used inter alia for 3D kitchen fronts. To this end, the films are pressed onto a wood substrate with the aid of a membrane press. The film here is exposed to a temperature of from 130° C. to 150° C., depending on the process. If the emboss-stability temperature is too low, the film can relax, and the amount of emboss decreases, or the emboss disappears completely. For this reason, the emboss-stability temperature is an important criterion of quality for furniture films. Its increase from 110° C. to 150° C. protects the emboss often provided on furniture films, even at emboss temperatures extending to just below 150° C., and prevents glossing, i.e. gloss increase during thermal processes.

If the films are used as card films, the increase in the emboss-stability temperature and heat resistance of the films permits their problem-free use even in an environment subjected to high thermal stress, for example in the tropics and in automobile interiors in midsummer.

The graph shows shrinkage (negative dimensional change) in % as a function of temperature for a film whose thickness is 35 µm, oriented longitudinally (in MD) with a stretching factor of 3.7. A negative transverse shrinkage value means transverse elongation of the film. A positive longitudinal shrinkage value indicates a shortening of the film. The percentage change for shrinkage is calculated from the dimensional change of the "shrunk" film with respect to the starting film, i.e. shrinkage S=(length of specimen prior to treatment minus length of specimen after treatment) divided by (length of specimen prior to treatment×100)

$$S = \left(\frac{L_0 - L_v}{L_0}\right) \times 100.$$

It can be seen that addition of Baymod AT 68 modifier in inventive examples 6 and 7 in table 2 reduces longitudinal shrinkage in comparison with the films of comparative examples 1 and 2, and that the rise of the shrinkage curves is less steep, and that the onset of shrinkage has been shifted to higher onset temperatures.

The higher shrinkage-onset temperatures and the flatter rise of the shrinkage curves for the inventive films extend the field of application of high-shrinkage polyester films, which also permit, if necessary, as a consequence of the additional matt effect, retention of surface gloss during shrinkage as a consequence of relatively high thermal stress. Overall, it can be stated that the use of the additives described above in the PET blends can give higher flexibility in the design of property profiles of the films than the use of copolymers, which are generally substantially more expensive and which quite often cannot achieve the desired property profile of the films.

Card films, and also shrink films, in each case comprise a polyester, ABS component(s), lubricant, and, if appropriate, matting agent, while furniture films comprise a polyester, lubricant, matting agent, and, if appropriate, ABS component(s).

The card films of the invention have increased heat resistance, which allows use involving higher thermal stresses. The shrink films have relatively low shrinkage and higher shrinkage onset temperature, and the furniture films have relatively high heat resistance with regard to the emboss and to surface gloss.

TABLE 1a

| Formulation | Raw material example (supplier) | Chemical name | Comparative examples Ex. 1 | Ex. 2 | PET/ABS blend - inventive examples Ex. 3 | Ex. 4 | Ex. 5 | Ex. 6 | Ex. 7 |
|---|---|---|---|---|---|---|---|---|---|
| Polyester | Cadence (Eastman) | see EP 1 066 339 B1 | 97.4 | 98.8 | 72.4 | 50.4 | 33.4 | 88.8 | 78.8 |
| ABS A | Baymod AT 49 (Lanxess) | Acrylonitrile-butadiene-styrene | — | — | 12.5 | 26 | 26 | — | — |
| ABS B | Baymod AT 68 (Lanxess) | alpha-Methylstyrene-acrylonitrile | — | — | 12.5 | 14 | 26 | 10 | 20 |
| ABS C | Baymod A52 (Lanxess) | Acrylonitrile-butadiene-styrene | — | — | — | 7 | 12 | — | — |
| Wax A | Licowax OP (Clariant) | Ester wax, partially hydrolyzed | 1 | 0.6 | 1 | 1 | 1 | 0.6 | 0.6 |
| Wax B | Pristerene 4900 (Unichema) | Saturated, unbranched aliphatic monocarboxylic acids, mainly palmitic acid and stearic acid | 1 | 0.6 | 1 | 1 | 1 | 0.6 | 0.6 |
|  | Merginat ESBO (Hobum Fettchemie) | Epoxidized soybean oil | 0.6 | — | 0.6 | 0.6 | 0.6 | — | — |
| Stretching parameter | Unit |  |  |  |  |  |  |  |  |
| Maximum degree of stretching | no unit (quotient calculated from prefilm thickness and thickness after stretching process) |  | — | 5 | — | — | — | 5 | 5 |
| Stretching temperature (film temp.) | [° C.] |  | — | 85 | — | — | — | 85 | 85 |

TABLE 1b

| Film property | Unit | Example 1 (Comp) | Example 2 (Comp) | Example 3 | Example 4 | Example 5 | Example 6 | Example 7 |
|---|---|---|---|---|---|---|---|---|
| Thickness | μm | 500 | — | 500 | 500 | 500 | — | — |
| Vicat A50 | °C | 76 | — | 89 | 100 | >110 | — | — |
| Vicat B50 | °C | 75 | — | 75 | 90 | 94 | — | — |
| Tensile impact strength (longitudinal/transverse) | kJ/m² | 267/300 | —/— | 538/617 | 444/448 | 487/398 | —/— | —/— |
| Modulus of elasticity (longitudinal/transverse) | N/mm² | 1310/1347 | —/— | 1431/1424 | 1370/1320 | 1389/1344 | —/— | —/— |
| Transverse dimensional change at 95°C | % | — | −76 | — | — | — | −60 | −40 |
| Transverse dimensional change at 75°C | % | — | −65 | — | — | — | −35 | −20 |
| Onset of shrinkage | °C | — | 60 | — | 1 | — | 65 | 70 |

Examples 1 and 2 are comparative examples; Examples 3–7 are PET/ABS blend inventive examples.

TABLE 2

| Formulation | Raw material example (supplier) | Chemical name | Comparative Example 1 | Example 2 | Example 3 | Example 4 | Example 5 |
|---|---|---|---|---|---|---|---|
| Polyester | Cadence (Eastman) | see EP 1 066 339 B1 | 98 | 93 | 96 | 97 | 94 |
| Wax A | Licowax OP (Clariant) | EstEster wax, partially hydrolyzed | 1 | 1 | 1 | 1 | 1 |
| Wax B | Pristerine 4900 (Unichema) | Saturated, unbranched aliphatic monocarboxylic acids, mainly palmitic acid and stearic acid | 1 | 1 | 1 | 1 | 1 |
| Matting agent A | Microcarb LB 10T (Revert) | Calcium carbonate | — | 5 | — | — | 2 |
| Matting agent B | Miston Vapar RC10 (Luzenac) | Aluminum silicate talc | — | — | 2 | — | 2 |
| Matting agent C | Azemat OP 278 (Degussa) | Acrylate-styrene copolymer | — | — | — | 1 | — |
| Film property | Unit | | | | | | |
| Thickness | μm | | 250 | 250 | 250 | 250 | 250 |
| Gloss, 20° | | | 72.6  58.6 | 65.1  31.7 | 26.8  27.1 | 46.1  11.4 | 14.3  8.9 |
| Gloss, 60° | | | 99.9  93.7 | 90.7  95.7 | 70.5  70.3 | 86.3  54.9 | 47.9  47.9 |
| Gloss 85° | | | 99.5  94.3 | 94.5  77.7 | 90.6  88.2 | 90.1  61.6 | 68.9  67.9 |
| Emboss-stability temperature | °C | | 110 | 150 | 150 | 150 | 150 |
| Rz | | | 0.41  0.45 | 2.15  2.6 | 2.43  1.41 | 1.05  3.13 | 2.83  2.52 |

What is claimed is:

1. A film comprising molding material consisting essentially of (i) resin consisting of polyester, said polyester comprising at least 80 mol % of a diacid radical component and from 80 to 100 mol % of a diol radical component, selected from diols having from 2 to 10 carbon atoms and from 0 to 20 mol % of a modified diol, (ii) optional waxes and (iii) polymeric modifiers based on ABS components and (iv) optionally a matting agent, wherein the molding material comprises from 30 to 97% by weight of polyester, waxes up to 3.0% by weight, and from 1.5 to 70% by weight of polymeric modifiers, where the percentages by weight are based on the total weight of the molding material;

the ABS components are acrylonitrile-butadiene-styrene, alpha-methylstyrene-acrylonitrile, and/or styrene-acrylonitrile or a modified form of these; and the polymeric modifiers modifies the roughness ($R_z$ value), heat resistance and/or gloss, surface structure, or shrinkage profile of films manufactured from the molding material, and the polymeric modifiers comprise a mixture of alpha-methylstyrene-acrylonitrile and acrylonitrile-butadiene-styrene, resulting in films exhibiting an emboss stability temperature ranging from 115 to 170° C. and a transverse tensile impact strength ranging from 350 to 630 kJ/m and unoriented film has a thickness of from 100 μm to 1 mm, with the unoriented film being stretched by a factor of from 1.1 to 7 to a thickness from 15 to 800 microns after orientation.

2. The film as claimed in claim 1, wherein the molding material further comprises a matting agent.

3. The film as claimed in claim 1, wherein the molding material comprises waxes and further comprises vegetable oil and the proportions of the polyester is from 33.4 to 88.8% by weight, the proportions of the waxes are from 1 to 2% by weight, the proportions of the ABS components are from 5 to 64% by weight, and the proportions of a vegetable oil are from 0 to 0.6% by weight, based on the total weight of the molding material.

4. The film as claimed in claim 1, wherein the molding material comprises waxes and further comprises matting agents and the proportions of the polyester is from 90 to 97% by weight, the proportions of the matting agents are from 0.0 to 10% by weight, and the proportions of the waxes are from 1 to 3% by weight, based on the total weight of the molding material.

5. The film as claimed in claim 3, wherein the waxes comprise partially hydrolyzed ester wax and/or saturated, unbranched aliphatic monocarboxylic acids, and/or montan waxes.

6. The film as claimed in claim 5, wherein the monocarboxylic acids are stearic acid and palmitic acid.

7. The film as claimed in claim 3, wherein the vegetable oil is epoxidized soybean oil.

8. The film as claimed in claim 4, wherein said molding material comprises one or more matting agents from the group of calcium carbonate, aluminum silicate talc and magnesium silicate talc, acrylate-styrene copolymer, and high-molecular-weight and/or crosslinked PVC.

9. The film as claimed in claim 3, wherein said molding material comprises from 70 to 74% by weight of polyester, from 23 to 27% by weight of ABS components, 2% by weight of waxes, and 0.6% by weight of vegetable oil.

10. The film as claimed in claim 3, wherein said molding material comprises from 49 to 52% by weight of polyester, from 46 to 48% by weight of ABS components, 2% by weight of waxes, and 0.6% by weight of vegetable oil.

11. The film as claimed in claim 3, wherein said molding material comprises from 33 to 35% by weight of polyester, from 62 to 64% by weight of ABS components, 2% by weight of waxes, and 0.6% by weight of vegetable oil.

12. The film as claimed in claim 4, wherein said molding material comprises from 92 to 94% by weight of polyester, 2% by weight of waxes, and from 4 to 6% by weight of matting agent.

13. The film as claimed in claim 4, wherein said molding material comprises from 95 to 97% by weight of polyester, 2% by weight of waxes, and from 1 to 3% by weight of matting agent.

14. The film as claimed in claim 1, wherein the thickness of the film is from 25 to 600 μm.

15. The film as claimed in claim 1, wherein the film has a Vicat A50 softening point is greater than or equal to 78° C. to 115° C.

16. The film as claimed in claim 1, wherein the film has a Vicat B50 softening point is greater than or equal to 75° C. to 100° C.

17. The film as claimed in claim 1, wherein the film has a transverse dimensional change measured at room temperature after storage of the film for 30 s in water at 95° C. is from −15 to −65%.

18. The film as claimed in claim 1, wherein the film has a transverse dimensional change measured at room temperature after storage of the film for 30 s in water at 75° C. is from −3 to −50%.

19. The film as claimed in claim 1, wherein the film has a shrinkage is from 3 to 50%, based on a film temperature of 75° C., a film thickness of 35 μm, and a longitudinal stretching factor of 3.7.

20. The film as claimed in claim 1, wherein the film has a shrinkage is from 15 to 65%, based on a film temperature of 95° C. a film thickness of 35 μm, and a longitudinal stretching factor of 3.7.

21. The film as claimed in claim 1, wherein the film further comprises from 1 to 10% by weight of matting agent selected from calcium carbonate, aluminum silicate talc, magnesium silicate talc, and acrylate-styrene copolymer.

22. Packaging film, shrink film, furniture film, or card film comprising film as claimed in claim 1.

23. The film as claimed in claim 1, wherein said film has been oriented longitudinally and/or transversely with respect to the film web with a degree of stretching of from 3 to 4.

24. The film as claimed in claim 14, wherein the thickness of the film is from 35 to 500 μm.

25. The film as claimed in claim 1, wherein the molding material comprises two waxes, one of which is a partially hydrolyzed ester wax and the other of which is a standard unbranched aliphatic monocarboxylic acid.

26. A molding material consisting of (i) polyester as resin, said polyester consisting of at least 80 mol % of a diacid radical component and from 80 to 100 mol % of a diol radical component, selected from diols having from 2 to 10 carbon atoms and from 0 to 20 mol % of a modified diol, (ii) optional waxes or mixtures of complex esters and of glycerol esters as lubricant, (iii) polymeric modifiers based on ABS components comprising acrylonitrile-butadiene-styrene, (iv) optional matting agent, (v) optional vegetable oil, (vi) optional colorants or dyes, (vii) optional flame-retardant additives, (viii) optional antistatic additives, (ix) optional plasticizers, and (x) optional PMMA, methylbutadiene-styrene or chlorinated polyethylene;

wherein the molding material comprises from 30 to 97% by weight of polyester, waxes up to 3.0% by weight, and from 1.5 to 70% by weight of polymeric modifiers, where the percentages by weight are based on the total weight of the molding material;

the ABS components are acrylonitrile-butadiene-styrene, alpha-methylstyrene-acrylonitrile, and/or styrene-acrylonitrile or a modified form of these; and the polymeric modifiers modify the roughness ($R_z$ value), heat resistance and/or gloss, surface structure, or shrinkage profile of films manufactured from the molding material.

27. A film as claimed in claim 1, wherein said molding material consists of (i) polyester, (ii) optional waxes, (iii) polymeric modifiers based on ABS components and (iv) optional matting agent.

28. A calendared packaging film comprising molding material as claimed in claim 1.

29. A film as claimed in claim 1, wherein said mixture comprises from 35 to 50% of alpha-methylstyrene-acrylonitrile, based on the weight of the mixture.

* * * * *